(12) United States Patent
Schwab et al.

(10) Patent No.: US 9,529,193 B2
(45) Date of Patent: Dec. 27, 2016

(54) DEVICE FOR OPERATING ONE OR MORE OPTICAL DISPLAY DEVICES OF A VEHICLE

(71) Applicant: Bayerische Motoren Werke Aktiengesellschaft, Munich (DE)

(72) Inventors: Axel Schwab, Munich (DE); Wolfgang Rieger, Groebenzell (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 2 days.

(21) Appl. No.: 14/593,838

(22) Filed: Jan. 9, 2015

(65) Prior Publication Data

US 2015/0116320 A1 Apr. 30, 2015

Related U.S. Application Data

(63) Continuation of application No. PCT/EP2012/070618, filed on Oct. 18, 2012.

(30) Foreign Application Priority Data

Jul. 10, 2012 (DE) .......................... 10 2012 212 015

(51) Int. Cl.
*G02B 27/01* (2006.01)
*G06T 17/00* (2006.01)

(52) U.S. Cl.
CPC ............... *G02B 27/01* (2013.01); *G06T 17/00* (2013.01); *G02B 2027/014* (2013.01)

(58) Field of Classification Search
None
See application file for complete search history.

(56) References Cited

U.S. PATENT DOCUMENTS 6,741,414 B1 * 5/2004 Boyd .................. G11B 15/467
360/73.03
6,744,436 B1 * 6/2004 Chirieleison, Jr. .. G06Q 10/087
345/419

(Continued)

FOREIGN PATENT DOCUMENTS

DE 101 32 043 A1 1/2003
DE 10 2004 014 671 A1 10/2005
(Continued)

OTHER PUBLICATIONS

International Search Report dated Oct. 15, 2013 (Three (3) pages).

(Continued)

*Primary Examiner* — Said Broome
(74) *Attorney, Agent, or Firm* — Crowell & Moring LLP

(57) ABSTRACT

The device for operating one or more optical display devices of a vehicle is configured to determine a three-dimensional model for a predefined environment of the vehicle depending on data sets provided and depending on a predefined latency time, wherein the data sets represent predefined vehicle information and/or driving information which is suitable for being signaled graphically and/or pictorially to a vehicle user. Furthermore, the device may be configured to determine pixel values for at least one portion of pixels of a digital image and/or of a graphical element depending on the three-dimensional model and to determine a signaling signal for signaling the pixel values of the pixels by means of the respective optical display device, wherein the predefined latency time represents at least one portion of a provision time duration comprising a temporal duration from a beginning of an acquisition of the vehicle information and/or driving information until the signaling of the signaling signal by means of the respective optical display device.

17 Claims, 3 Drawing Sheets

(56) References Cited

U.S. PATENT DOCUMENTS

| | | | |
|---|---|---|---|
| 7,605,773 | B2 | 10/2009 | Janssen |
| 7,925,982 | B2 | 4/2011 | Parker et al. |
| 9,079,526 | B2 * | 7/2015 | Ishikawa ................ B60Q 1/00 |
| 2009/0009314 | A1 * | 1/2009 | Taniguchi ................ B60R 1/00 340/461 |
| 2010/0141555 | A1 * | 6/2010 | Rorberg ............... G02B 27/017 345/8 |
| 2011/0093190 | A1 | 4/2011 | Yoon |
| 2012/0146809 | A1 | 6/2012 | Oh et al. |
| 2012/0174004 | A1 | 7/2012 | Seder et al. |

FOREIGN PATENT DOCUMENTS

| | | |
|---|---|---|
| DE | 10 2007 058 437 A1 | 6/2009 |
| DE | 10 2008 042 734 A1 | 4/2010 |
| DE | 10 2010 003 850 A1 | 10/2011 |
| EP | 0 643 315 A1 | 3/1995 |
| EP | 1 118 838 A2 | 7/2001 |
| EP | 1 916 645 A1 | 4/2008 |
| EP | 2 159 541 A1 | 3/2010 |
| FR | 2 862 380 A1 | 5/2005 |
| WO | WO 2008/078187 A2 | 7/2008 |
| WO | WO 2011/015843 A2 | 2/2011 |

OTHER PUBLICATIONS

German Search Report dated Apr. 16, 2013, with Statement of Relevancy (Five (5) pages).

* cited by examiner

DEVICE FOR OPERATING ONE OR MORE OPTICAL DISPLAY DEVICES OF A VEHICLE

CROSS REFERENCE TO RELATED APPLICATIONS

This application is a continuation of PCT International Application No. PCT/EP2012/070618, filed Oct. 18, 2012, which claims priority under 35 U.S.C. §119 from German Patent Application No. 10 2012 212 015.7, filed Jul. 10, 2012, the entire disclosures of which are herein expressly incorporated by reference.

BACKGROUND AND SUMMARY OF THE INVENTION

The invention relates to a device for operating one or more optical display devices of a vehicle and a display system for the vehicle.

Today's motor vehicles have various control units which are designed to carry out various vehicle functions. For example, functions relating to driver information are carried out by a combi instrument. Navigation functions are carried out by a different control unit, for example in a head unit. Displays relating to navigation and to driver information are predominantly effected by means of different optical display devices which are directly associated with the control units. For example, the driver information is displayed by means of a combi instrument panel and the navigation information by means of a central vehicle display.

The object on which the invention is based is to create a device for operating at least one optical display device and a display system for a vehicle which enables an efficient and reliable optical signaling of information in the vehicle.

The object is achieved by the characteristics of the independent claims. Advantageous developments of the invention are characterized in the dependent claims.

According to a first aspect, the invention is characterized by a device for operating one or more optical display devices of a vehicle. The device is designed to determine a three-dimensional model for a predefined environment of the vehicle depending on data sets provided and depending on a predefined latency time, wherein the data sets represent predefined vehicle information and/or driving information which is suitable for being signaled graphically and/or pictorially to a vehicle user. Furthermore, the device is designed to determine pixel values for at least one portion of pixels of a digital image and/or of a graphical element depending on the three-dimensional model and to determine a signaling signal for signaling the pixel values of the pixels by means of the respective optical display device, wherein the predefined latency time represents at least one portion of a provision time duration comprising a temporal duration from a beginning of an acquisition of the vehicle information and/or driving information until the signaling of the signaling signal by means of the respective optical display device.

Advantageously, this enables contact-analogous displays, in particular in a head-up display, to be generated with high reliability and in real time. Because the image generation, in particular the image synthesis, can be carried out centrally in the device, delay times and provision latency times can easily be taken into account. Here, the delay times can represent a time duration until the determined image data reach the display sinks. Here, the provision latency times can in each case represent a time duration which is in each case necessary for a provision of various data from different units which are used for generating the respective image. For example, it may be necessary to use data from a driver assistance system and/or from a device external to the vehicle and/or data from a navigation device in order to generate a suitable image. The central image generation enables complex, three-dimensional representations to be displayed coherently and with high quality in the one or more optical display devices, in particular in the head-up display and/or in a combi instrument.

In an advantageous embodiment of the first aspect, the device can be coupled by means of signals to a predefined vehicle communications network and designed to receive the data sets via the vehicle communications network. This has the advantage that the device can be designed as a self-contained unit which, in particular, can be used for operating a head-up display.

In a further advantageous embodiment of the first aspect, the data sets have a predefined metadata structure which is suitable for characterizing the vehicle information and/or driving information in text form. This has the advantage that information, in particular the driving information and/or vehicle information, for which a signaling signal that graphically and/or pictorially characterizes the information is normally generated and provided, can be implemented in the data sets with the metadata structure. The data sets can be transmitted efficiently and then used in the device for generating an image. A transmission bandwidth can be reduced in comparison with a transmission of the driving information and/or vehicle information in the form of character commands. This can contribute to the driving information and/or vehicle information being displayed with high quality in spite of a limited transmission bandwidth. Further, the metadata structure of the data sets enables the three-dimensional model to be determined more easily and/or more reliably and/or more precisely. The metadata structure of the data sets can contribute to logical links being able to be described more precisely.

In a further advantageous embodiment of the first aspect, the device is designed to determine the three-dimensional model and/or the pixel values and/or the signaling signal depending on a particular design of the optical display device. Advantageously, this enables complex three-dimensional representations to be displayed reliably and with high quality by means of the respective optical display device.

In a further advantageous embodiment of the first aspect, the device is designed to determine the three-dimensional model and/or the pixel values and/or the signaling signal for the one optical display device or for a further optical display device depending on a current display situation of one of the optical display devices. This has the advantage that, if the current display situation of the one optical display device does not permit the required display, the determined information can be signaled in a suitable manner by means of the further optical display device. Such a case can occur, for example, when a contact-analogous representation of defined information is not permitted in the head-up display due to too great a number of display elements in a display field of the head-up display. In this case, the defined information can be signaled by the further optical display device.

In a further advantageous embodiment of the first aspect, the respective driving information and/or vehicle information is assigned a predefined priority and the device is designed to determine the three-dimensional model and/or the pixel values and/or the signaling signal for the one optical display device or for the further optical display device depending on the priority. Advantageously, this enables a display prioritization of the respective driving information and/or vehicle information, on the one hand within the one optical display device and/or within the one further optical display device and, on the other hand, also between the one and the one further optical display device.

In a further advantageous embodiment of the first aspect, the priority of the respective driving information and/or vehicle information is determined depending on a currently determined traffic situation and/or driving situation of the vehicle. Advantageously, this enables the display prioritization to be adapted dynamically to the current traffic situation and/or driving situation.

In a further advantageous embodiment of the first aspect, the optical display device comprises a head-up display having a predefined display field. The device is designed to determine the pixel values of the graphical element and to display them on the predefined display field of the head-up display depending on the three-dimensional model in such a way that the graphical element is perceived by an observer of the display field from a predefined viewing position with direct reference to the real environment of the vehicle. Embedding and/or superimposing the graphical element as virtual information in a real environment perceived by a vehicle user enables a predictive character of the information, in particular of the driving information and/or vehicle information, to be perceived easily, reliably and in an easily understandable manner by the vehicle user.

In a further advantageous embodiment of the first aspect, the device is designed to determine the pixel values for the at least one portion of the pixels of the digital image depending on further pixel values of a predefined environmental image. Advantageously, this enables the digital image to be superimposed upon the environmental image, for example for indication on an LC display.

According to a second aspect, the invention is characterized by a display system for a vehicle. The display system includes a first control unit which is designed to provide predefined data sets. Further, the display system includes a device for operating one or more display devices according to the first aspect, and a vehicle communications network which couples the first control unit and the device by means of signals for transmitting the data sets from the first control unit to the device. Furthermore, the display system has one or more optical display devices which are each coupled to the device by means of signals and are each designed to receive and signal a signaling signal determined by the device in each case.

Complementary advantageous embodiments of the first aspect also apply to the second aspect.

Advantageously, the image can be generated in a single processing unit in the vehicle, preferably in the device. It is not necessary for images to be generated in different places, that is to say in different processing units of the vehicle, for example in a head unit and in a combi instrument, which images are then brought together in one of the two processing units. It is sufficient for the data necessary for synthesizing the image, also referred to as rendering, to be made available to only the one processing unit, preferably the device. Image generation by the device simplifies consistent image generation. Particularly in the case of a complex three-dimensional representation, it is possible to determine coherent and high-quality display content. In the case of a display with high real-time requirements, in particular for a contact-analogous representation with the head-up display, the performance demands on the device which synthesizes the image are very high. Generating the image in the device for the contact-analogous head-up display relieves the load on further arithmetic units, for example the processor in the navigation unit, and enables a driving-situation-dependent display prioritization of all content in the head-up display in real time. A contact-analogous display, in particular in a head-up display, can be generated with high reliability and in real time. Because the image generation, in particular the image synthesis, can be carried out centrally in the device, delay times and provision latency times can easily be taken into account.

The driving information and/or vehicle information can be provided by further units of the vehicle, for example by the driver assistance system and/or the navigation device, and/or devices external to the vehicle and transmitted to the first control unit. The first control unit can be designed to determine the data sets depending on the predefined driving information and/or vehicle information, wherein the data sets can have a predefined metadata structure which is suitable for characterizing the driving information and/or vehicle information in text form.

In an advantageous embodiment of the second aspect, the one or more optical display devices is/are coupled by means of signals to the device via a predefined multimedia interface. This enables the determined signaling signal to be transmitted efficiently and reliably.

Exemplary embodiments of the invention are explained below by means of the schematic drawings.

In the drawings:

Other objects, advantages and novel features of the present invention will become apparent from the following detailed description of one or more preferred embodiments when considered in conjunction with the accompanying drawings.

Elements with the same design or function are provided with the same references in all the figures.

DETAILED DESCRIPTION OF THE DRAWINGS

Figure 1:
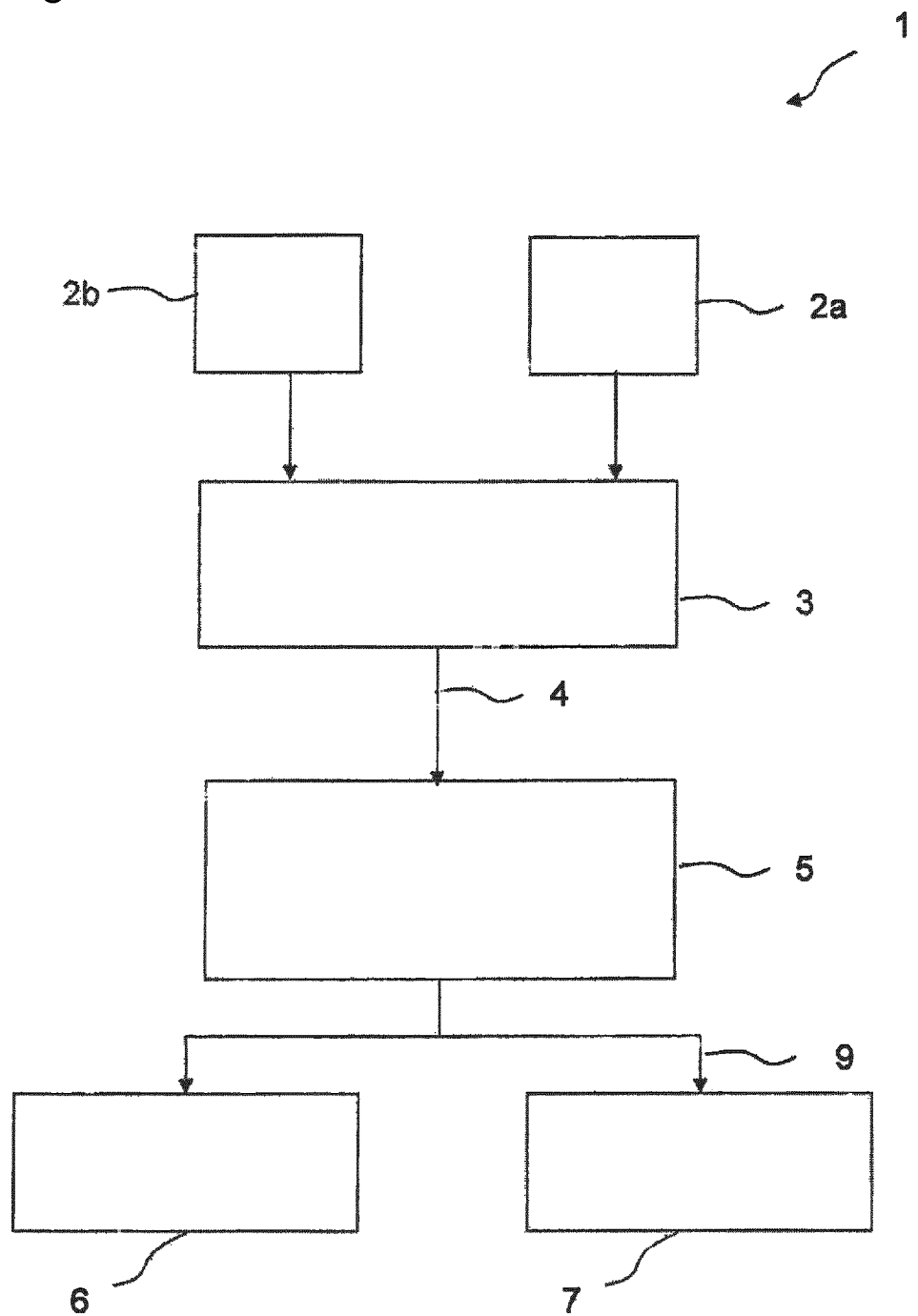
FIG. 1 shows a schematic block diagram for a display system of a vehicle.

FIG. 1 shows an exemplary embodiment of a display system 1 of a vehicle. The display system 1 comprises a first control unit 3 and a device 5 for operating at least one optical display device. The at least one optical display device is preferably arranged in the vehicle. In the exemplary embodiment shown in FIG. 1, by way of example, the display system 1 has a first display device 6 and a second display device 7.

By way of example, the first display device 6 comprises a monitor screen. The monitor screen can, for example, be designed as a liquid crystal display, also referred to as LC display. In particular, the first display device can be arranged in a combi instrument panel of the vehicle.

By way of example, the second display device 7 comprises a head-up display 10. An exemplary embodiment of the head-up display 10 is shown in detail in FIG. 2.

The first control unit 3 shown in FIG. 1 comprises, for example, a central arithmetic unit of the vehicle, also referred to as head unit. The first control unit 3 is coupled by means of signals to the device 5, for example via a predefined vehicle communications network 4, to operate the at least one optical display device. The vehicle communications network 4 can comprise a vehicle bus for example. Alternatively, it is also possible for the vehicle communications network 4 to comprise a single cable connection. Alternatively or in addition, it is possible for the vehicle communications network 4 to comprise a wireless communications connection. The first control unit 3 is designed, for example, to transmit predefined data sets to the device 5 via the vehicle communications network 4 and therefore to make them available to the device 5.

The data sets represent driving information and/or vehicle information which is suitable for being signaled graphically and/or pictorially to a vehicle user.

The vehicle information and/or driving information can, for example, be determined and/or provided by a driver assistance system and/or by a navigation device and/or by a device 2b external to the vehicle. For this purpose, the first control unit 3 can be coupled by means of signals to one or more further vehicle devices 2a and/or to one or more devices 2b external to the vehicle. For example, the first control unit 3 can be coupled by means of signals to the one or to the further vehicle devices 2a via the vehicle communications network 4. The vehicle communications network 4 can network widely differing devices in the vehicle using communications technology. The vehicle communications network 4 can be divided into sub-systems which, for example, are coupled by means of gateways.

The driving information can, for example, comprise a driving instruction and/or a current traffic situation and/or a current driving situation and/or a current environmental situation, for example a current outside temperature, and so forth. The vehicle information can, for example, represent a current vehicle operating state, for example a speed of the vehicle.

The first control unit 3 is designed, for example, to provide the data sets with a predefined metadata structure which is suitable for characterizing the vehicle information and/or driving information in text form. The vehicle information and/or driving information is therefore not provided in the form of character commands or as picture-in-picture content but in the form of metadata. For example, a character command or video image is not transmitted for a turn-off arrow but only the characteristic information of a driving instruction. This can take place in the following predefined metadata structure in text form, for example:
<Action>; <Direction element>; <Distance>
For example, along the lines of:
 "Turn right in 200 m"
 "Take the right-hand lane in 300 m"

The device 5 is coupled by means of signals to the first control unit 3 via the vehicle communications network 4 and is designed to receive data sets transmitted by the first control unit 3. Further, the device 5 is coupled by means of signals to the first 6 and to the second display device 7.

The device 5 is designed to determine a three-dimensional model for a predefined environment of the vehicle depending on the data sets provided and depending on a predefined latency time. Furthermore, the device 5 is designed to determine pixel values for at least one portion of pixels of a digital image and/or of a graphical element 8 depending on the three-dimensional model and to determine a signaling signal for signaling the pixel values of the pixels by means of the respective optical display device, wherein the predefined latency time represents at least one portion of a provision time duration comprising a temporal duration from a beginning of an acquisition of the vehicle information and/or driving information until the signaling of the signaling signal by means of the respective optical display device.

The predefined latency time can include delay times and provision latency times. Here, the delay times can in each case represent a time duration until the determined image data reach the display sinks. The provision latency times can in each case represent a time duration which is in each case necessary for a provision of various data from different units which are used for generating the respective image.

The device 5 is further designed, for example, to determine the three-dimensional model for the predefined environment of the vehicle depending on predefined route data and/or predefined environmental data. The route data and/or environmental data can, for example, be gathered by the first control unit 3 and/or one or more further vehicle devices 2a. For this purpose, the first control unit 3 and/or the further vehicle devices 2a are, for example, in each case coupled by means of signals to one or more sensor units. The respective sensor units are designed to determine environmental data of the vehicle. The particular sensing unit can have an optical gathering device, for example a video camera, and/or a radar sensor and/or an ultrasonic sensor and/or a lidar sensor. The route data can be provided by the navigation device for example. The predefined route data and/or predefined environmental data are, for example, likewise provided by the first control unit 3 for the device 5. The route data and/or environmental data can, for example, likewise be provided as metadata having the predefined metadata structure which enables the route data and/or environmental data to be characterized in text form. For this purpose, the first control unit 3 can be designed to determine the data sets which represent route data and/or environmental data depending on the gathered route data and environmental data respectively.

Furthermore, the device 5 can be designed to determine environmental model data, which represent a predefined environment of the vehicle, depending on the gathered environmental data.

The device 5 is designed, for example, to determine a three-dimensional scene, which represents a virtual spatial model, depending on the environmental model data. The virtual spatial model defines objects, for example, and their material properties, light sources, and the position and viewing angle of an observer.

The device 5 further includes an image synthesis unit, for example, also referred to as rendering unit, which is designed to determine objects visible to a virtual observer, to determine an appearance of surfaces, influenced by their material properties, and to calculate a light distribution within the scene.

The signaling signal determined by the device 5 is transmitted, for example, to the first 6 and/or to the second display device 7. For this purpose, the device 5 is coupled, for example, by means of a predefined multimedia interface 9, to the first 6 and/or to the second display device 7. The multimedia interface 9 can be a High-Definition Multimedia Interface for example.

The device 5 is designed, for example, to determine the three-dimensional model and/or the pixel values and/or the signaling signal depending on a particular design of the optical display device, such that a reliable and high-quality complex three-dimensional representation by means of the particular optical display device is possible.

In order to signal required driving information and/or vehicle information by means of the head-up display 10, the device 5 is designed, for example, to determine the pixel values of the graphical element 8 and to display them on a predefined display field 11 of the head-up display 10 depending on the three-dimensional model in such a way that the graphical element 8 is perceived by an observer of the display field 11 from a predefined viewing position with direct reference to the real environment of the vehicle.

Further, in order to signal the required driving information and/or vehicle information by means of the LC display of the combi instrument, the device 5 can be designed, for example, to determine the pixel values for the at least one portion of pixels of the digital image depending on further pixel values of a predefined environmental image, so that the digital image of the environmental image can be displayed in a superimposed manner on the LC display of the combi instrument. The environmental field image can be recorded, for example by means of an optical recording device, for example with a video camera.

Further, the device 5 can be designed to determine the three-dimensional model and/or the pixel values and/or the signaling signal for the second display device 7, that is to say, for example, for the head-up display, or for the first display device 6, for example for the LC display of the combi instrument panel, depending on a current display situation of one of the optical display devices, for example depending on a display density in the display field 11 of the head-up display 10.

Furthermore, it can be provided that the respective driving information and/or vehicle information is assigned a predefined priority and the device 5 is designed to determine the three-dimensional model and/or the pixel values and/or the signaling signal for the one optical display device, for example for the second display device 7, or for the further optical display device, for example for the first display device 6, depending on the priority. This can be used advantageously, for example, for a display prioritization of the respective driving information and/or vehicle information within the head-up display 10 and for a display prioritization between the head-up display 10 and the LC display of the combi instrument panel. At the same time, the priority of the respective driving information and/or vehicle information is determined, for example, depending on a currently determined traffic situation and/or driving situation of the vehicle.

Figure 2:
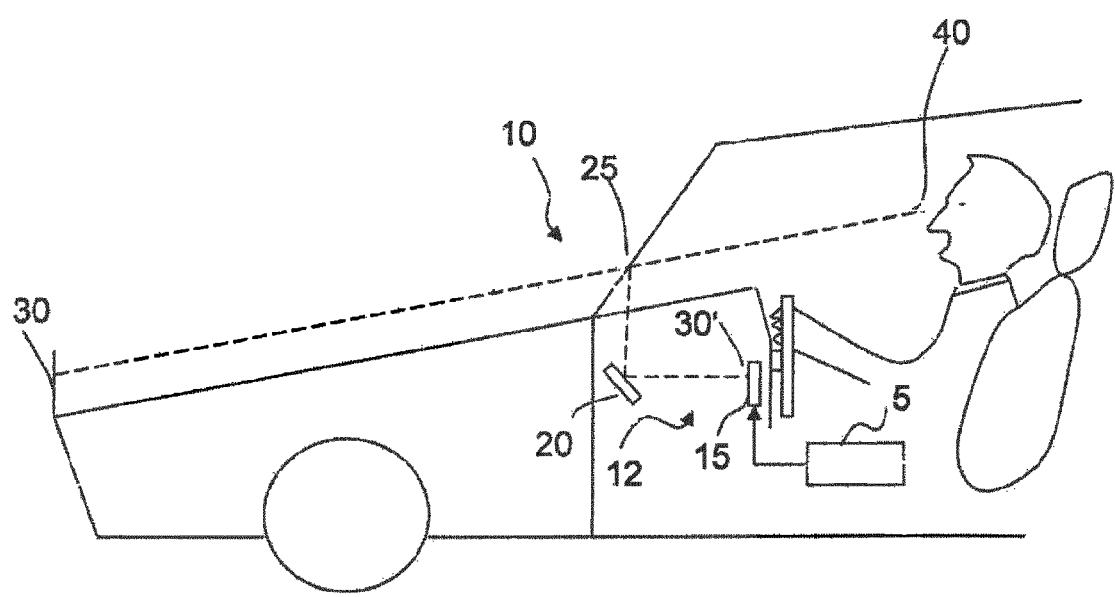
FIG. 2 shows a head-up display for the vehicle.

FIG. 2 shows an exemplary embodiment of a head-up display 10.

The head-up display 10 includes an image generation device 12 for generating a virtual image 30. The image generation device 12 comprises a display 15 for generating a real image 30' and an optical system for generating the virtual image 30. The optical system comprises an imaging first 20 and second mirror 25. A real image 30' generated by the display 15 is first guided onto the first mirror 20 and projected by the first mirror 20 onto the second mirror 25. The second mirror 25 can be designed as a windshield 32 of a vehicle 1.

The virtual image 30 appears from a predefined eyebox 40 at a distance in front of the windshield 32, for example at the end of the engine hood. In general, the virtual image 30 can only be seen from a defined region, the so-called eyebox 40. The eyebox 40 is usually designed so that the complete virtual image 30 can be seen from the whole of the required eyebox range.

Static display content which is continuously or frequently displayed can be shown in the virtual image 30. Furthermore, the image generation device 12 can be designed such that image content which is only displayed briefly and on a situational basis is displayed in the virtual image 30. In particular, the head-up display 10 can be designed as a contact-analogous head-up display 10. With head-up displays 10, differentiation is made between contact-analogous and non-contact-analogous representation. Contact-analogous display forms enrich the environment perceived by the driver by superimposing artificially generated scenery. On the other hand, non-contact-analogous display forms present information without direct reference to the environment.

Figure 3:
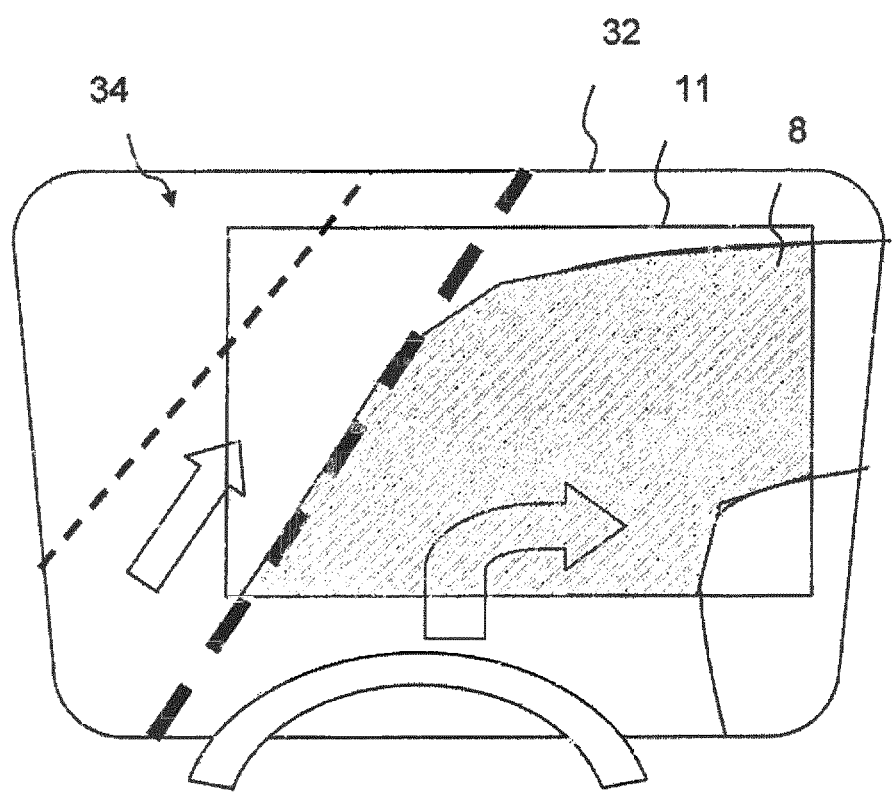
FIG. 3 shows an example of a contact-analogous display of the head-up display.

FIG. 3 shows, by way of example, the predefined display field 11 on a windshield 32 of the vehicle. The graphical element 8 is displayed on the display field 11. In the example shown in FIG. 3, the graphical element 8 is displayed in such a way that the observer perceives the real traffic lane marked in color in front of the vehicle; the graphical element 8 is therefore perceived by an observer of the display field 11 with direct reference to the real environment 34 of the vehicle. As the image generation, in particular the image synthesis, is carried out centrally in the device 5, delay times and provision latency times can easily be taken into account and image generation is possible in real time, thus enabling contact-analogous representation to take place with high reliability and high quality.

LIST OF REFERENCES

1 Display system
2a Further vehicle device
2b Device external to the vehicle
3 First control unit
4 Vehicle communications network
5 Device
6 First display device
7 Second display device
8 Graphical element
9 Multimedia interface
10 Head-up display
11 Display field
12 Image generation device
15 Display
20 First mirror
25 Second mirror
30 Virtual image
30' Real image
32 Windshield
34 Real environment of the vehicle The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A non-transitory computer-readable medium encoded with computer program instructions for operating one or more optical display devices of a vehicle, wherein the computer program instructions comprise instructions, when executed by a device:

to determine a three-dimensional model for a predefined environment of the vehicle depending on data sets provided and depending on a predefined latency time, wherein the data sets represent predefined vehicle information and/or driving information which is suitable for being signaled graphically and/or pictorially to a vehicle user;

to determine pixel values for at least one portion of the pixels of a digital image and/or of a graphical element depending on the three-dimensional model; and to determine a signaling signal for signaling the pixel values of the pixels by the respective optical display device, wherein the predefined latency time represents at least one portion of a provision time duration comprising a temporal duration from a beginning of an acquisition of the vehicle information and/or driving information until the signaling of the signaling signal by a respective one of the one or more optical display devices.

2. The non-transitory computer-readable medium according to claim 1, wherein the device is in communication with a predefined vehicle communications network and the device is designed to receive the data sets via the vehicle communications network.

3. The non-transitory computer-readable medium according to claim 1, wherein the data sets have a predefined metadata structure which is suitable for characterizing the vehicle information and/or driving information in text form.

4. The non-transitory computer-readable medium according to claim 1, further comprising computer program instructions, when executed by the device, to determine the three-dimensional model and/or the pixel values and/or the signaling signal depending on a particular design of the respective one of the one or more optical display devices.

5. The non-transitory computer-readable medium according to claim 2, further comprising computer program instructions, when executed by the device, to determine the three-dimensional model and/or the pixel values and/or the signaling signal depending on a particular design of the respective one of the one or more optical display devices.

6. The non-transitory computer-readable medium according to claim 3, further comprising computer program instructions, when executed by the device, to determine the three-dimensional model and/or the pixel values and/or the signaling signal depending on a particular design of the respective one of the one or more optical display devices.

7. The non-transitory computer-readable medium according to claim 4, further comprising computer program instructions, when executed by the device, to determine the three-dimensional model and/or the pixel values and/or the signaling signal for the respective one of the one or more optical display devices, or for a further optical display device, depending on a current display situation of one of the optical display devices.

8. The non-transitory computer-readable medium according to claim 5, further comprising computer program instructions, when executed by the device, to determine the three-dimensional model and/or the pixel values and/or the signaling signal for the respective one of the one or more optical display devices, or for a further optical display device, depending on a current display situation of one of the optical display devices.

9. The non-transitory computer-readable medium according to claim 6, further comprising computer program instructions, when executed by the device, to determine the three-dimensional model and/or the pixel values and/or the signaling signal for the respective one of the one or more optical display devices, or for a further optical display device, depending on a current display situation of one of the optical display devices.

10. The non-transitory computer-readable medium according to claim 4, wherein the respective driving information and/or vehicle information is assigned a predefined priority, and wherein the non-transitory computer-readable medium further comprises computer program instructions, when executed by the device, to determine the three-dimensional model and/or the pixel values and/or the signaling signal for the respective one of the one or more optical display devices, or for the further optical display device depending on the predefined priority.

11. The non-transitory computer-readable medium according to claim 7, wherein the respective driving information and/or vehicle information is assigned a predefined priority, and wherein the non-transitory computer-readable medium further comprises computer program instructions, when executed by the device, to determine the three-dimensional model and/or the pixel values and/or the signaling signal for the respective one of the one or more optical display devices, or for the further optical display device depending on the predefined priority.

12. The non-transitory computer-readable medium according to claim 10, wherein the predefined priority of the respective driving information and/or vehicle information is determined depending on a currently determined traffic situation and/or driving situation of the vehicle.

13. The non-transitory computer-readable medium according to claim 11, wherein the predefined priority of the respective driving information and/or vehicle information is determined depending on a currently determined traffic situation and/or driving situation of the vehicle.

14. The non-transitory computer-readable medium according to claim 1, wherein the respective one of the one or more optical display devices comprises a head-up display having a predefined display field, and the non-transitory computer-readable medium further comprises computer program instructions, when executed by the device, to determine the pixel values of the graphical element and to display them on the predefined display field of the head-up display depending on the three-dimensional model such that the graphical element is perceived by an observer of the display field from a predefined viewing position with direct reference to the real environment of the vehicle.

15. The non-transitory computer-readable medium according to claim 1, wherein the non-transitory computer-readable medium further comprises computer program instructions, when executed by the device, to determine the pixel values for the at least one portion of the pixels of the digital image depending on further pixel values of a predefined environmental image.

16. A display system for a vehicle comprising:
a first control unit configured to provide predefined data sets,
the device according to one of claim 1; and
a vehicle communications network which couples the first control unit and the device and is configured to transmit the data sets from the first control unit to the device,
wherein the one or more optical display devices are each in communication with the device and are each designed to receive and signal a signaling signal determined by the device in each case.

17. The display system according to claim 16, wherein the one or more optical display devices are in communication with the device via a predefined multimedia interface.

* * * * *